United States Patent
Chung et al.

(10) Patent No.: US 12,451,178 B2
(45) Date of Patent: Oct. 21, 2025

(54) SYNAPSE DEVICE AND METHOD OF OPERATING THE SAME

(71) Applicant: POSTECH Research and Business Development Foundation, Pohang-si (KR)

(72) Inventors: Yoonyoung Chung, Pohang-si (KR); Suwon Seong, Yongin-si (KR); Seongmin Park, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 154 days.

(21) Appl. No.: 18/522,109

(22) Filed: Nov. 28, 2023

(65) Prior Publication Data
US 2024/0203473 A1 Jun. 20, 2024

(30) Foreign Application Priority Data
Dec. 16, 2022 (KR) .......................... 10-2022-0177321

(51) Int. Cl.
| | |
|---|---|
| G11C 11/405 | (2006.01) |
| G06N 3/065 | (2023.01) |
| G11C 11/4096 | (2006.01) |
| G11C 11/54 | (2006.01) |
| H10B 12/00 | (2023.01) |

(52) U.S. Cl.
CPC ............ G11C 11/405 (2013.01); G06N 3/065 (2023.01); G11C 11/4096 (2013.01); G11C 11/54 (2013.01); H10B 12/00 (2023.02)

(58) Field of Classification Search
CPC ... G11C 11/405; G11C 11/4096; G11C 11/54; G06N 3/065; G06N 3/063; H10B 12/00; H10D 30/6734; H10D 30/6755
USPC ............................................ 365/184, 189.05
See application file for complete search history.

(56) References Cited

U.S. PATENT DOCUMENTS

| | | | |
|---|---|---|---|
| 10,141,069 B2 | 11/2018 | Ikeda et al. | |
| 2012/0063204 A1* | 3/2012 | Kamata ................ | H10D 86/423 365/149 |
| 2022/0336517 A1* | 10/2022 | Nara ................. | H10F 39/80373 |
| 2022/0384454 A1* | 12/2022 | Hsu ...................... | H10D 64/685 |

* cited by examiner

*Primary Examiner* — Michael T Tran
(74) *Attorney, Agent, or Firm* — Morgan, Lewis & Bockius LLP

(57) ABSTRACT

A synapse device may include an oxide semiconductor transistor divided into a write transistor and a read transistor. The write transistor is an oxide semiconductor transistor having a dual gate including a bottom gate located below a thin oxide semiconductor layer and a top gate located above the thin oxide semiconductor layer.

13 Claims, 14 Drawing Sheets

SYNAPSE DEVICE AND METHOD OF OPERATING THE SAME

CROSS-REFERENCE TO RELATED APPLICATION

This application claims the benefit of and priority to Korean Application No. 10-2022-0177321, filed on Dec. 16, 2022, the entirety of which is incorporated herein by reference for all purposes.

TECHNICAL FIELD

The present disclosure relates to a synapse device and a method of operating the same and, more particularly, to a synapse device and a method of operating the same that can perform a neural network operation with low power consumption by applying a dual gate structure.

BACKGROUND

Recently, an artificial neural network is the most widely used as a machine learning technique in the field of artificial intelligence. In the artificial neural network method, forward propagation in which input values of one neural network layer are multiplied by weight values and an output value obtained by adding the values is input into a next neural network layer and backward propagation in which an error between an inferred value and a true value is back tracked to induce appropriate modification of a weight should be repeatedly performed.

In the Von Neumann architecture that is widely used computer architecture, a memory in which an input value and a weight are stored and a processor which performs an arithmetic operation are separated from each other. Thus, when repeatedly performing the artificial neural network operation, a bottleneck problem is worsening due to frequent data movement between the memory and the processor. Therefore, in order to efficiently process a corresponding operation, the importance of a synapse device that has a memory function to learn and store an appropriate neural network weight while also performing a processor function multiplying it by the input value is being emphasized.

For efficient and accurate learning of the artificial neural network, the weight value of the synapse device should be linearly and symmetrically adjusted in a wide range with respect to an electrical signal (application of voltage, current or pulse) for programming. Further, the weight value may be programmed to an intended and appropriate value only when there is a uniform response without any deviation between devices or operation cycles. An inference process requires non-volatility to maintain weight values determined during the learning process without losing the weight values, and ability to process a large amount of data through fast operating speed and low operating power. Currently, various types of synapse devices such as RRAM, PCM, MRAM, and FeFET have been proposed, but do not satisfy all of the above-mentioned requirements.

RELATED LITERATURE

Patent Literature

U.S. Pat. No. 10,141,069

SUMMARY

In view of the above, the present disclosure provides a synapse device and a method of operating the same, in which a weight value of the synapse device using an oxide semiconductor transistor is progressively learned through pulse input, and the synapse device using the oxide semiconductor transistor including a dual gate electrode is utilized, thus allowing only a weight of a desired cell to be selectively adjusted even when synapse devices are arrayed.

According to embodiments of the present disclosure, a synapse device includes an oxide semiconductor transistor divided into a write transistor and a read transistor, and the write transistor is an oxide semiconductor transistor having a dual gate including a bottom gate located below a thin oxide semiconductor layer, and a top gate located above the thin oxide semiconductor layer.

Each of the top gate and the bottom gate of the oxide semiconductor transistor may be adjustable in threshold voltage.

The oxide semiconductor transistor may include a semiconductor substrate, a bottom gate formed over the semiconductor substrate, a bottom gate insulator formed over the bottom gate, a thin oxide semiconductor layer formed over the bottom gate insulator, source/drain electrodes formed on both ends of the thin oxide semiconductor layer, a top gate insulator formed over the thin oxide semiconductor layer, and a top gate formed over the top gate insulator.

The synapse device may further include an ultra-thin insulator layer provided over the thin oxide semiconductor layer, and the ultra-thin insulator layer may be formed of any one selected from SiO2, Al2O3, HfO2, a self-assembled monomolecular layer, and a combination thereof.

Programming may be performed only when the top gate and the bottom gate of the write transistor are simultaneously activated.

According to embodiments of the present disclosure, in a method of operating a synapse array using a synapse device including an oxide semiconductor transistor divided into a write transistor and a read transistor, the write transistor may be formed in a dual gate structure including a bottom gate located below a thin oxide semiconductor layer, and a top gate located above the thin oxide semiconductor layer, whereby a selected cell may be programmed by individually adjusting a threshold voltage of each of the bottom gate and the top gate.

A programming pulse may be applied to the top gate, and a DC signal for selecting whether or not to program may be applied to the bottom gate.

Programming is possible only when the top gate and the bottom gate of the write transistor are simultaneously activated.

A write transistor of a corresponding cell may be deactivated by increasing the threshold voltage of the write transistor of a cell different from the selected cell.

Programming may be performed only when an ON voltage is applied to the top gate and the bottom gate, so update time in total time may be determined by a product of a duty ratio of a row and a column.

According to embodiments of the present disclosure, a method of operating a synapse array using a synapse device having an oxide semiconductor transistor divided into a write transistor and a read transistor may include controlling a threshold voltage through a select line connected to a selected cell, activating a gate line connected to the selected cell, and activating only the write transistor of the selected cell among cells connected to the gate line according to a control result of the threshold voltage, thus programming the selected cell.

The controlling the threshold voltage may include controlling the threshold voltage by applying a specific voltage to a top gate of the write transistor through the select line.

The controlling the threshold voltage may include causing a voltage greater than a voltage applied to the bottom gate of the write transistor to be applied to the top gate.

The disclosed technology may have the following effects. Since this does not mean that a specific embodiment should include all of the following effects or only the following effects, the scope of the disclosed technology should not be limited thereto.

A synapse device and a method of operating the same according to an embodiment of the present disclosure are advantageous in that a weight value of the synapse device using an oxide semiconductor transistor is progressively learned through pulse input, and only a weight of a desired cell can be selectively adjusted using a corresponding learning method even when synapse devices are arrayed.

BRIEF DESCRIPTION OF THE DRAWINGS

FIG. 9A-1 is a schematic diagram illustrating an oxide semiconductor transistor according to an embodiment of the present disclosure.

FIGS. 9A-2, 9A-3 and 9B are diagrams illustrating a threshold voltage control process of the synapse device according to the present disclosure.

DETAILED DESCRIPTION

Figure 1:
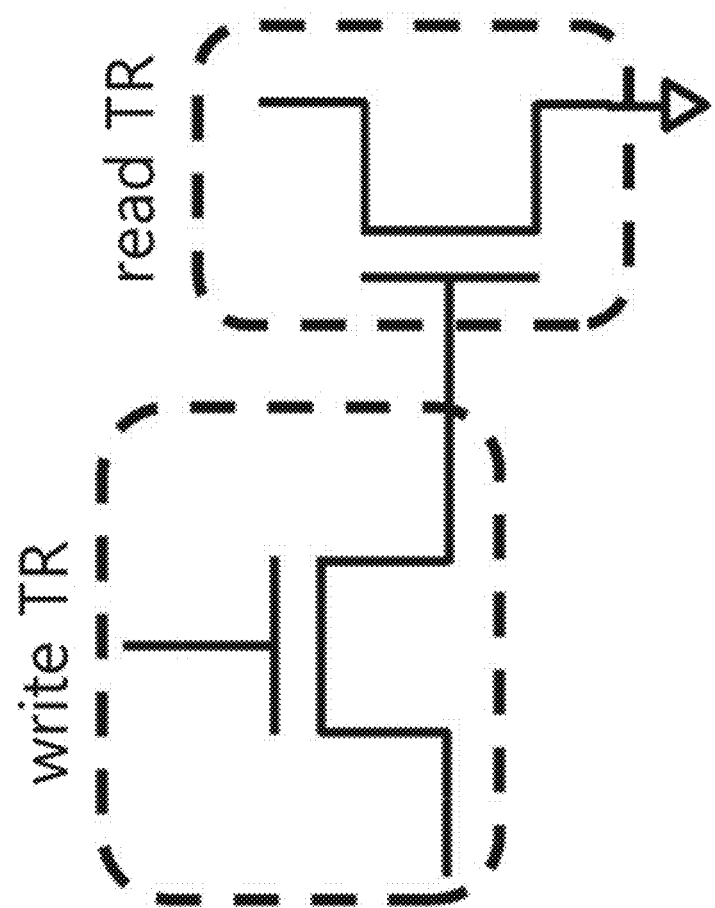
FIG. 1 is a diagram illustrating the structure of a synapse device using an oxide semiconductor transistor.

Specific structural or functional descriptions in the embodiments of the present disclosure introduced in this specification or application are only for description of the embodiments of the present disclosure. The descriptions should not be construed as being limited to the embodiments described in the specification or application. The present disclosure may, however, be embodied in many different forms, but should be construed as covering modifications, equivalents or alternatives falling within ideas and technical scopes of the present disclosure. Further, since effects disclosed herein do not mean that a specific embodiment should include all or only the effects, the scope of the present disclosure should not be construed as being limited thereto.

Meanwhile, the meaning of terms described herein will be understood as follows.

It will be understood that, although the terms "first", "second", etc. may be used herein to distinguish one element from another element, these elements should not be limited by these terms. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

In the present disclosure, the singular forms are intended to include the plural forms as well, unless the context clearly indicates otherwise. It will be further understood that the terms "comprise", "include", "have", "composed of," etc. when used in this specification, specify the presence of stated features, integers, steps, operations, elements, components, and/or combinations of them but do not preclude the presence or addition of one or more other features, integers, steps, operations, elements, components, and/or combinations thereof.

In each step, reference characters (e.g. a, b, c, etc.) are used for the convenience of description. The reference characters do not designate the order of the steps, and the steps may be performed in a different order unless the context clearly indicates otherwise. That is, the steps may be performed in the specified order, may be performed substantially simultaneously, or may be performed in a reverse order.

The present disclosure can be implemented as a computer-readable code on a computer-readable recording medium. The computer-readable recording medium includes all types of recording devices in which data readable by a computer system is stored. Examples of the computer-readable recording medium include ROM, RAM, CD-ROM, magnetic tape, floppy disk, an optical data storage device, etc. In addition, the computer-readable recording medium may be distributed in a computer system connected via a network, so that computer-readable codes may be stored and executed in a distributed manner.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, exemplary embodiments of the present disclosure will be described in detail with reference to the accompanying drawings. The same reference numerals are used throughout the drawings to designate the same or similar components.

Recently, in order to implement a synapse device with ideal characteristics, research has been conducted on the synapse device that expresses a weight by adjusting the gate voltage of a read transistor (read TR) through a write transistor (write TR) as shown in FIG. 1 using a metal oxide semiconductor with excellent characteristics. When implementing the synapse device using a metal oxide semiconductor transistor, an on/off current ratio and transconductance (gm) are high, so it is possible to advantageously have as wide range of multi-level weight even with a small amount of charge charging/discharging. Because it is possible to implement a very low off current value, the learned weight value may be well maintained during an inference process.

Further, an amorphous oxide semiconductor material has good large-area uniformity, so it may have the advantage of having a very low error between devices even when constructing a large-scale neural network. However, since only an oxide semiconductor-based synapse device and array configuration are conventionally focused, more research is needed on important topics such as an operation technique for efficiently executing neural network learning, a method for improving weight maintenance time, and a select device required for array operation.

A current neural network learning model is based on a gradient-descent method which gradually modifies a weight value from a previous value. Since the conventional research adjusts the weight through DC voltage, it is difficult to apply the gradient-descent method, so the stored weight should be read, a desired weight should be calculated, and then the level of the DC voltage should be adjusted to input a new weight. Since such a complicated process should be performed, a circuit for operation is inevitably complex and power efficiency is low. Thus, a new operating method suitable for the gradient-descent method is needed.

Generally, the high charge mobility of the oxide semiconductor is advantageous for fast operation speed of an electronic circuit. However, when the synapse device is operated in an array, output currents of devices located in each column of one row during an inference process are combined. Thus, as an array size increases, a higher current flows. This may cause not only high power consumption itself, but also additional problems such as IR drop in a row line (a voltage error occurs as the product of row line current and resistance) or increased complexity of peripheral circuitry such as ADC, which may lead to limitations on array size. Therefore, there is a need for a method that may limit the output current of the oxide semiconductor transistor within an appropriate range.

In order to precisely adjust the current amount of the oxide semiconductor transistor, methods are used to replace a target used during sputtering to match a target current value or to change the composition ratio of the oxide semiconductor transistor through chemical vapor deposition (CVD) or atomic layer deposition (ALD). The charge mobility may be controlled by adjusting oxygen (O) saturation or a metal content such as In or Ga in an oxide semiconductor material such as IGZO, which is composed of compounds of various elements. However, these methods negatively affect charge mobility as well as reliability during long-term device operation, uniformity between devices, and process cost and time. In addition, most research has focused further on increasing rather than decreasing charge mobility, so methodology for reducing a current amount is limited.

FIG. 1 is a diagram illustrating the structure of a synapse device using an oxide semiconductor transistor.

Referring to FIG. 1, the synapse device according to the present disclosure may be composed of two oxide semiconductor transistors, which may be used as a write transistor (write TR) and a read transistor (read TR), respectively. That is, the write transistor may play a writing role, while the read transistor may play a reading role.

Further, the read transistor and the write transistor may be connected through a storage node. As the storage node is charged and discharged through the write transistor, the conductivity of the read transistor may be adjusted. In other words, it is a structure in which a weight may be expressed by adjusting the gate voltage of the read TR through the write TR, and the conductivity of the read TR may be programmed.

Figure 2:
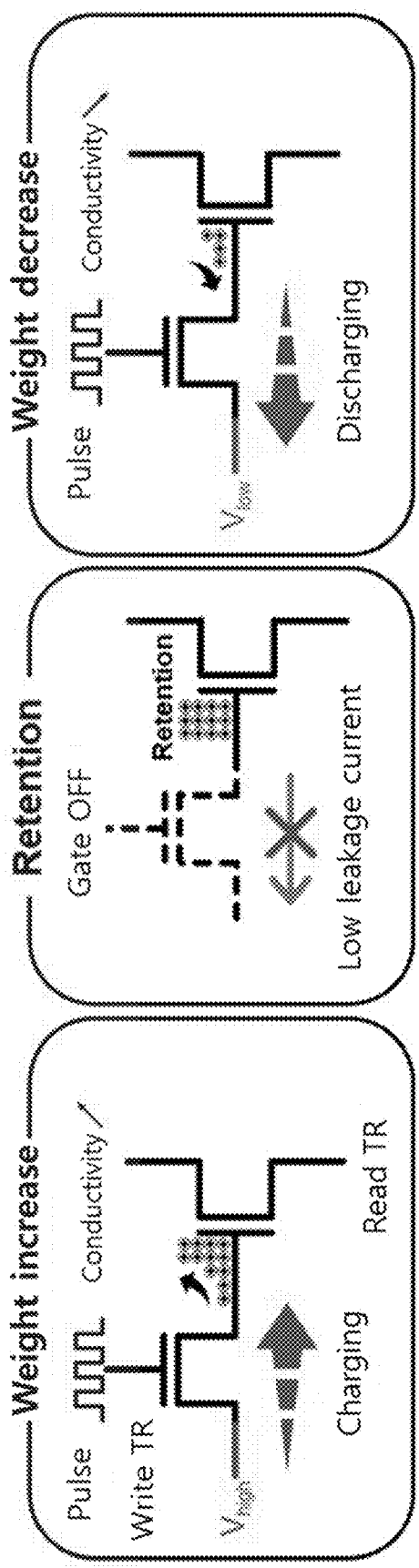
FIG. 2 is a diagram illustrating a method of operating the synapse device of FIG. 1.

FIG. 2 is a diagram illustrating a method of operating the synapse device of FIG. 1.

Referring to FIG. 2, in the method of operating the synapse device composed of the oxide semiconductor transistor according to the present disclosure, only two fixed voltages, i.e., a voltage (Vhigh) for increasing the weight and a voltage (Vlow) for decreasing the weight are applied to a drain electrode of the write TR, as shown in FIG. 2. In order to change the weight value, a pulse is applied to the gate electrode while one of corresponding voltages is applied to the drain electrode of the write TR for the purpose of increasing or decreasing.

After programming is completed, the write TR is turned off to maintain a corresponding weight value. Since the typical oxide semiconductor transistor such as IGZO performs an n-type operation, a voltage at pulse on should be sufficiently higher than the threshold voltage of the write TR to smoothly perform charging or discharging operation. A difference between a voltage at pulse off and Vlow is sufficiently lower than the threshold voltage of the write TR, thus turning the write TR into an off state. Thereby, it may be set so that there is no charge movement during non-programming operation. Further, a pulse width may be set sufficiently short to be subdivided into multiple multi-level weight values within an operating range.

Since such a programming method has only to adjust the number of pulses applied to the write TR gate electrode depending on an amount to be updated without destroying the weight value stored in a previous cycle, progressive weight programming is possible with pulse input without a complex ADC at a high level, thus allowing multi-level weights to be stored and adjusted in a gradient-descent friendly manner.

Figure 3:
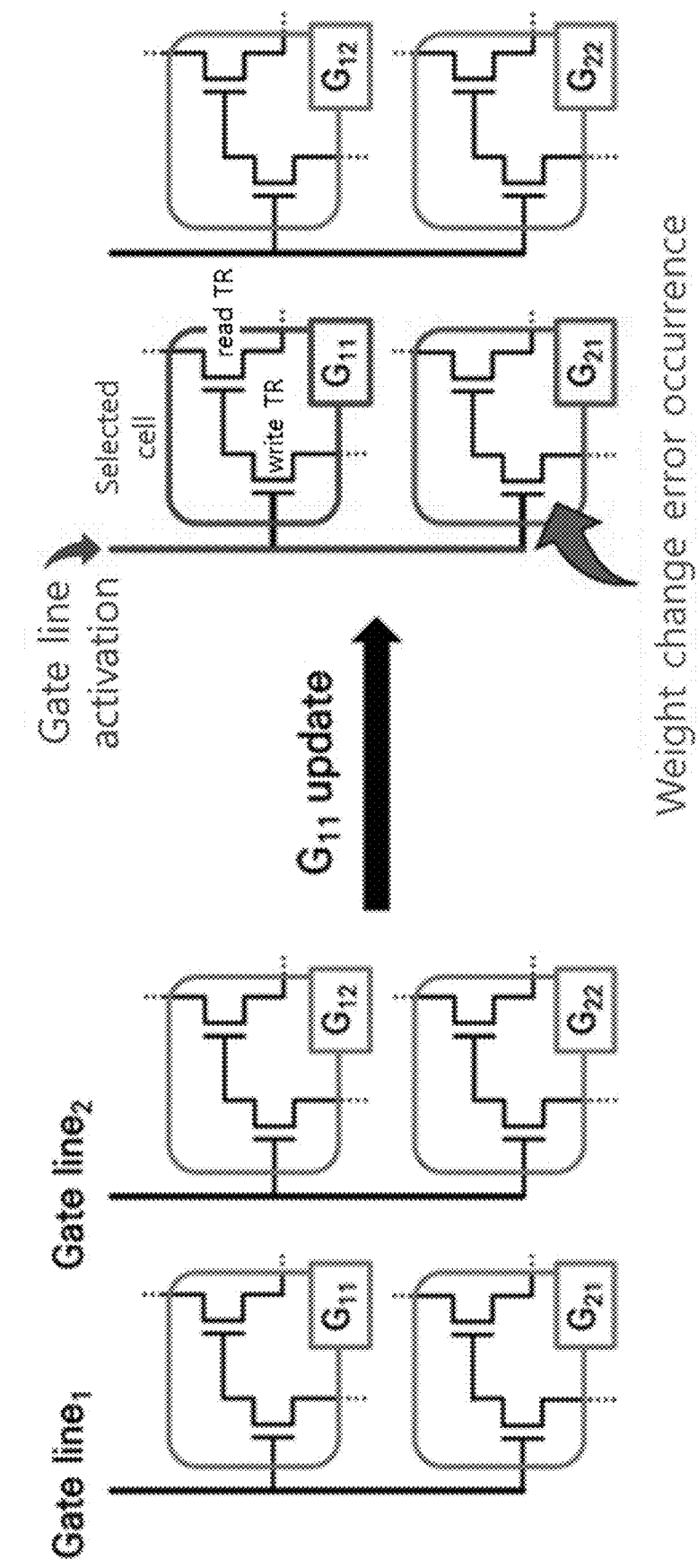
FIG. 3 shows a synapse array in which synapse devices of FIG. 1 are arranged in an array.

FIG. 3 shows a synapse array in which synapse devices of FIG. 1 are arranged in an array.

Referring to FIG. 3, in the synapse array, each single synapse device is arranged in an array in X-axis and Y-axis directions. In order to actually perform neural network operation, the synapse devices should be arranged as shown in FIG. 3, and then weight programming should be selectively performed for a device at a desired position.

However, since the drain electrode of the write TR determines only whether to charge/discharge and the number of pulses applied to the gate determines a programming amount, programming interference occurs when gates of the write TR connected to the same line as shown in FIG. 2 are selected, so cells other than the selected cell for which programming is desired are simultaneously programmed, thereby causing a weight change error. That is, additional switching is required to adjust the weight of each device to a desired level during array operation.

In order to solve this problem, the present disclosure proposes a method of applying a
dual gate structure to the write TR.

Figure 4:
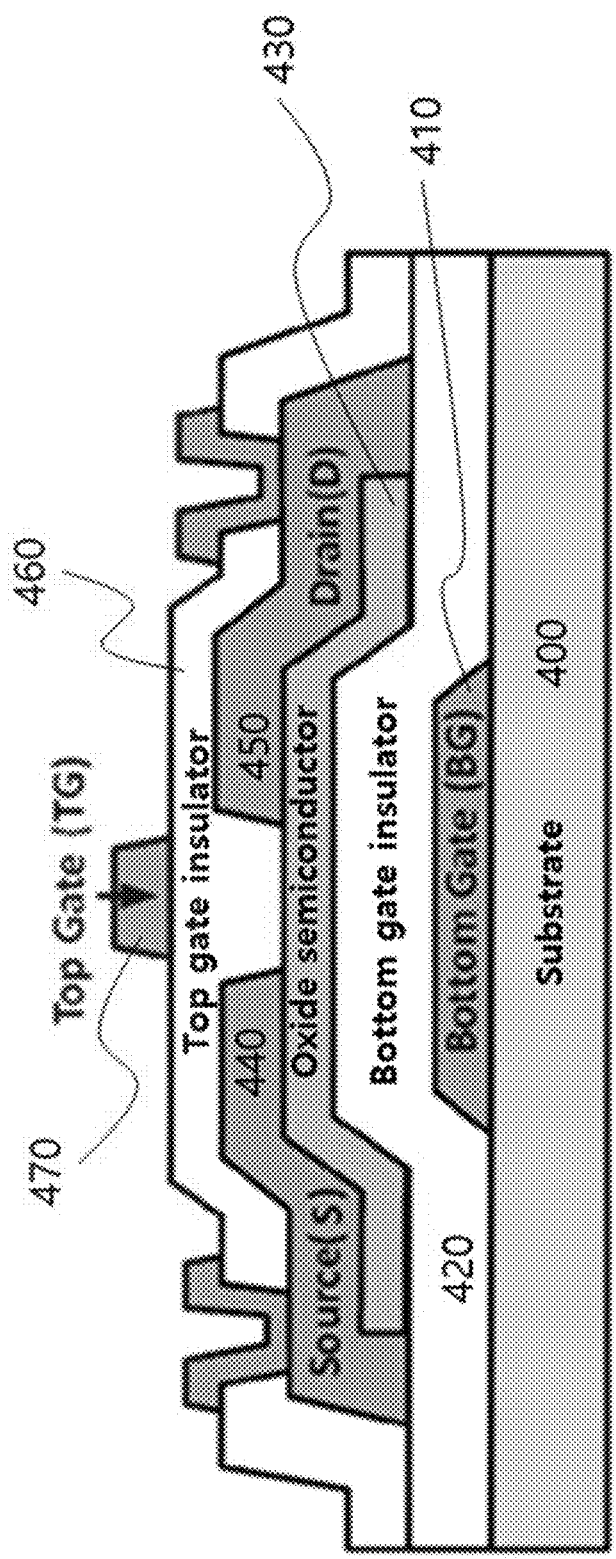
FIG. 4 illustrates an oxide semiconductor transistor according to an embodiment of the present disclosure.

FIG. 4 shows an oxide semiconductor transistor according to an embodiment of the present disclosure.

Referring to FIG. 4, the oxide semiconductor transistor of the present disclosure may be formed in a dual gate structure with gates formed below and above an oxide semiconductor channel region.

First, a bottom gate 410 is formed over a semiconductor substrate 400, and a bottom gate insulator 420 is formed over the entire semiconductor substrate including the bottom gate 410.

A thin oxide semiconductor layer 430 is formed over the bottom gate insulator 420, and a source electrode 440 and a drain electrode 450 are formed on both ends of the thin oxide semiconductor layer 430. In this case, the source electrode 440 and the drain electrode 450 are disposed on the same layer to be spaced apart from each other by a predetermined distance, and the thin oxide semiconductor layer 430 is exposed between the source electrode 440 and the drain electrode 450. Although not shown in the drawing, an ultra-thin insulator layer may be further included at interfaces between the oxide semiconductor channel region of the thin oxide semiconductor layer and the source electrode and the drain electrode. The ultra-thin insulator layer may be formed to the thickness of 3 nm or less, preferably 1 to 2 nm. As the ultra-thin insulator, any one selected from SiO2, Al2O3, HfO2, a self-assembled monomolecular layer, and a combination thereof may be used.

Further, a top gate insulator 460 is deposited on an entire top including the source electrode 440 and the drain electrode 450, and a top gate 470 is formed over the top gate insulator 460.

Figure 5:
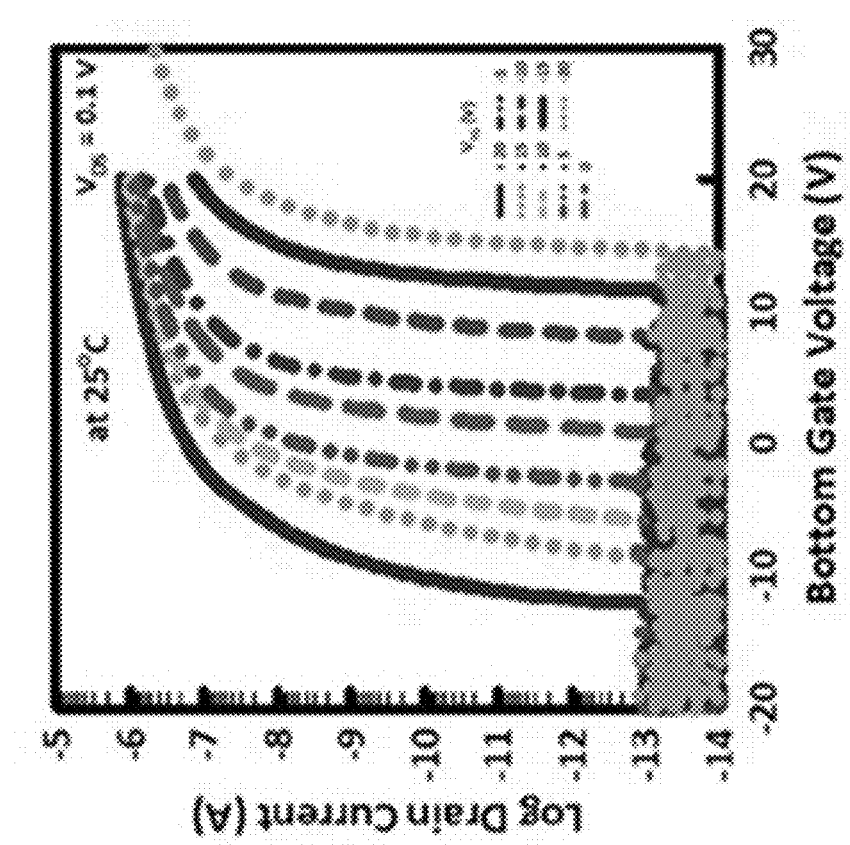
FIG. 5 is a diagram illustrating voltage and current characteristics of the oxide semiconductor transistor of FIG. 4.

As such, in the case of the oxide semiconductor transistor with the dual gate structure including the bottom gate 410 and the top gate 470, each threshold voltage may be adjusted by forming gates at the top and bottom of the oxide semiconductor channel region. Referring to FIG. 5, the threshold voltage of an oxide semiconductor thin film transistor can be seen by applying a voltage to the top gate electrode.

Figure 6:
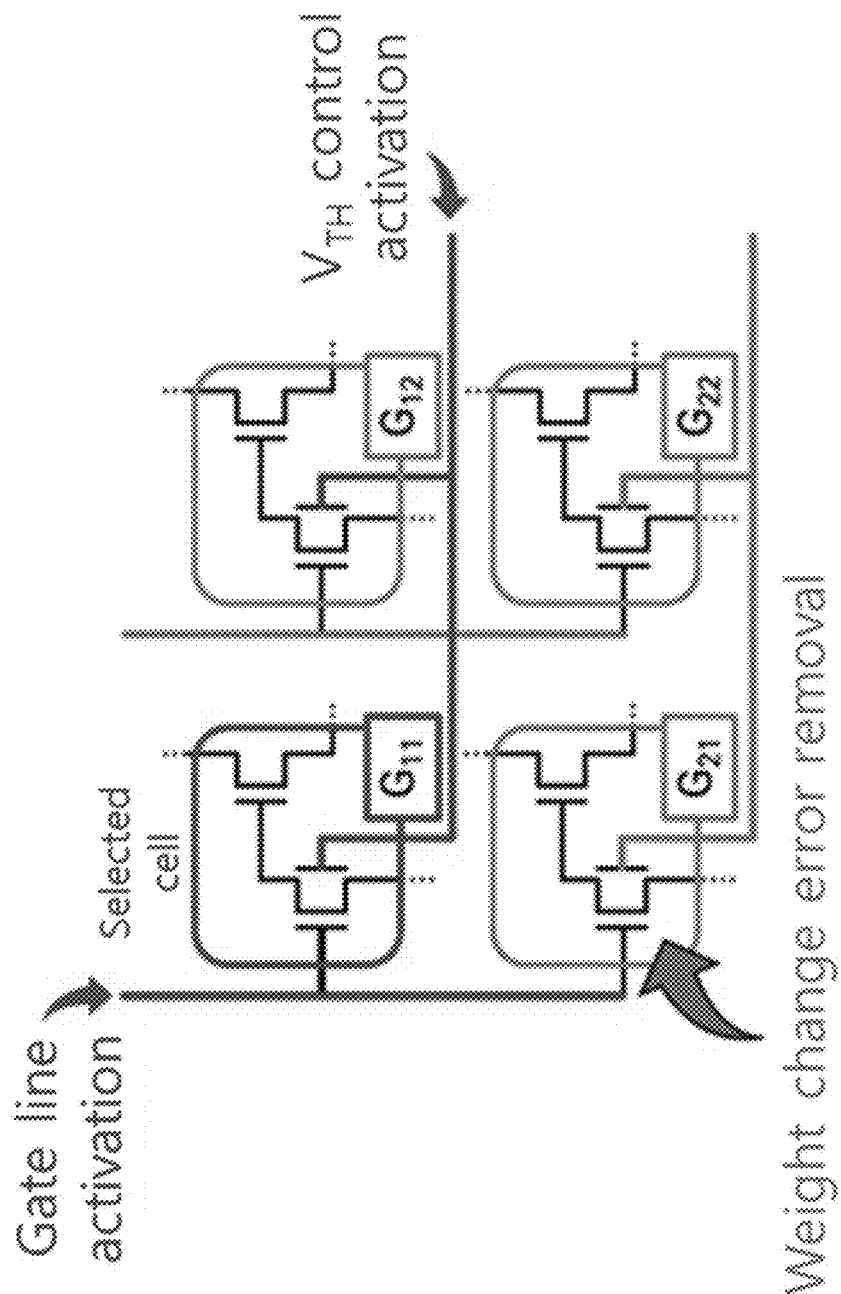
FIG. 6 is a diagram showing the operation of a synapse device array using the oxide semiconductor transistor of FIG. 4.
Figure 7:
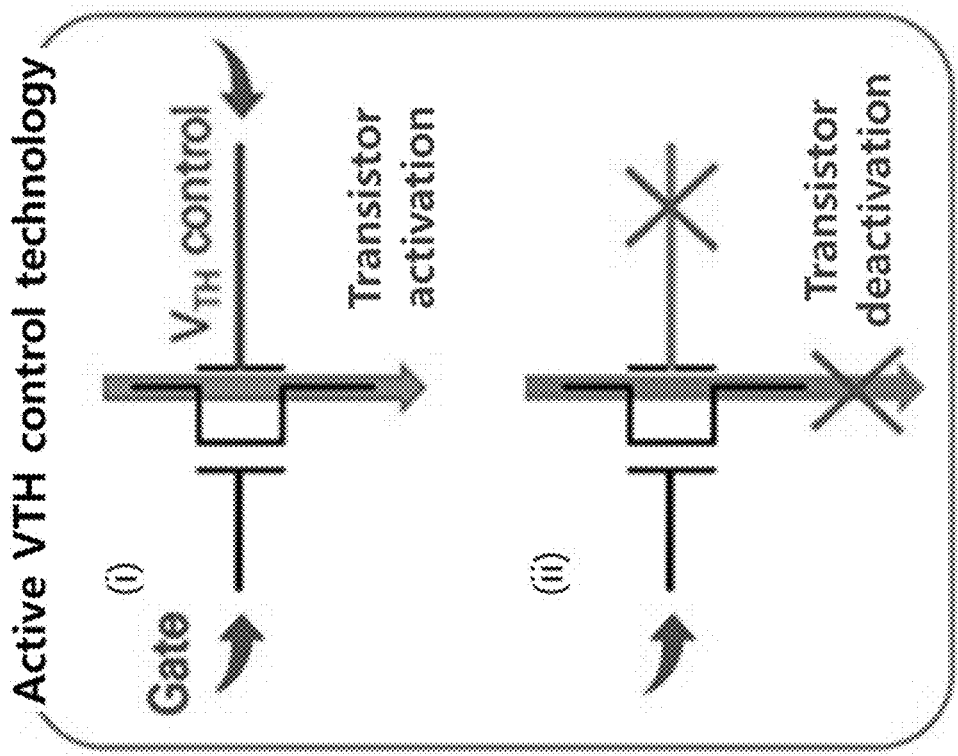
FIG. 7 is a diagram illustrating the activation of the oxide semiconductor transistor of the synapse device.

FIG. 6 is a diagram showing the operation method of a synapse device array using the oxide semiconductor transistor of FIG. 4, and FIG. 7 is a diagram illustrating the activation of the oxide semiconductor transistor of the synapse device.

First, referring to FIG. 6, the synapse array is composed of synapse devices G11, G12, G21, and G22 ... to which the oxide semiconductor transistor having the dual gate structure is applied, and the dual gate may be applied to the write TR. The synapse device array may be configured such that the programming pulse for activating the gate line is applied to one gate of the dual gate of the write TR, and a DC signal for selecting whether to perform programming is applied to the other gate. This will be described below in detail with reference to FIG. 7. The transistor of the selected cell in the activated state of the gate line may be activated to be programmed (see FIG. 7(i)). In contrast, the transistor of the corresponding cell may be deactivated by increasing the threshold voltage of the write TR that is not selected in the activated state of the gate line (see FIG. 7(ii)).

When the dual gate is applied to the write TR, only a desired cell may be programmed by actively adjusting the threshold voltage (VTH) of the write TR without adding a transistor or greatly increasing an area, and an error caused by the weight programming interference in array operation may be eliminated.

As described above, when the oxide semiconductor transistor including the dual gate structure as shown in FIG. 4 is applied to the synapse device using the oxide semiconductor transistor shown in FIG. 1 and the operating method shown in FIGS. 6 and 7 is applied, the operation ability of the neural network with a very large number of parameters can be dramatically improved.

Recently, as artificial intelligence technology is increasingly advanced, the number of parameters used in the neural network is exponentially increasing. When updating millions or tens of millions of parameters, it takes too much time and power to calculate each parameter and thereby check what value is stored, to calculate how much updates need to be done, and to perform update. Thus, for a large-scale neural network array, it is almost impossible to update weights one by one programmatically, row-by-row and column-by-column. Therefore, only when it is possible to perform operation in the stochastic parallel update method, which stochastically programs the entire array at the same time, the time and amount of operations consumed during weight programming can be dramatically reduced. Accordingly, stochastic parallel update compatibility is very important. According to the present disclosure, programming occurs only when the top gate and the bottom gate are simultaneously activated. Therefore, it is possible to introduce the stochastic parallel update method that stochastically programs many devices in the array in parallel at once, enabling the efficient operation of the large-scale neural network.

Figure 8:
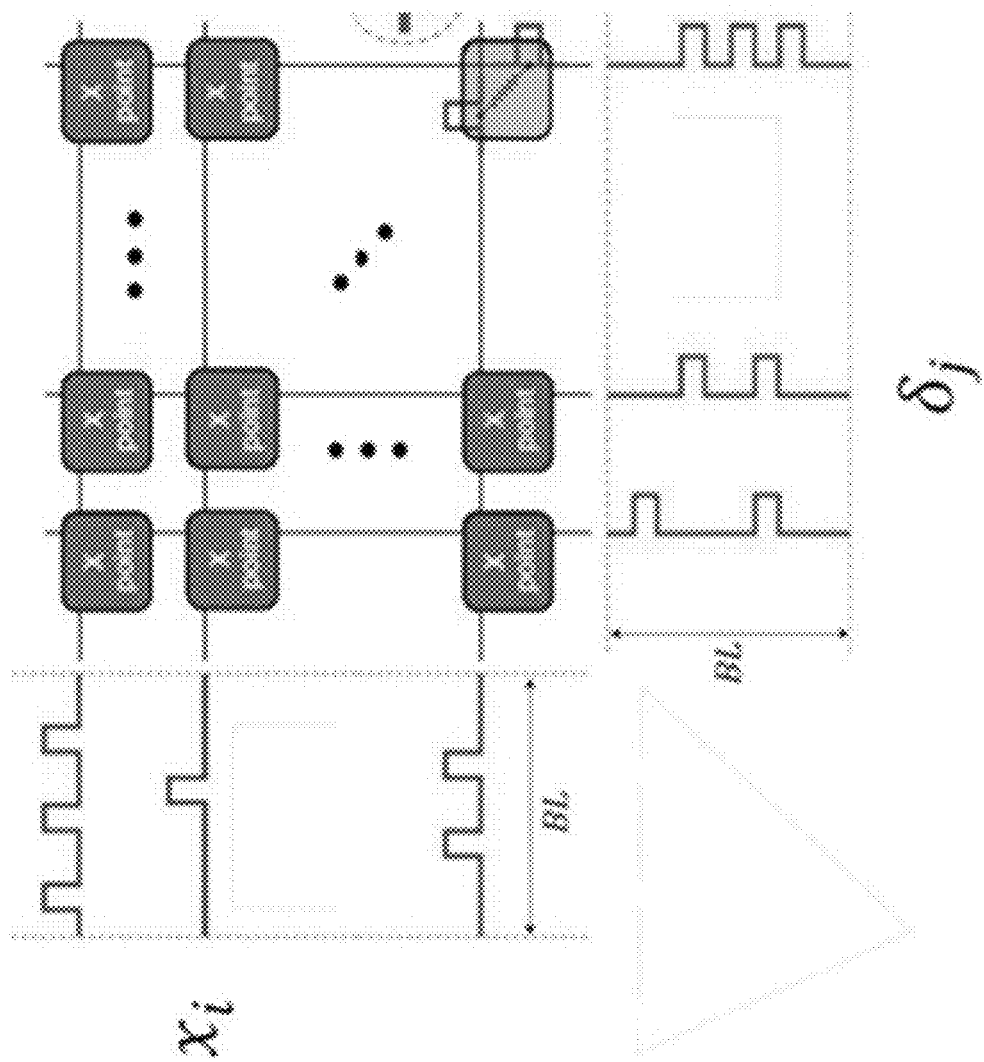
FIG. 8 is a diagram illustrating stochastic parallel update.

FIG. 8 is a diagram illustrating the stochastic parallel update.

The stochastic parallel update will be described as follows with reference to FIG. 8. The stochastic parallel update is a method in which random pulses with a specific duty ratio in rows and columns are input, and updates occur only when two signals are in a specific state according to the duty ratio, so all devices receiving the pulse signals are simultaneously updated in parallel.

As in the example shown in FIG. 8, when applying the random pulse with the duty ratio calculated according to the weight update amount required for $X_i$ and $\delta_j$ with $X_i$ in the column and $\delta_j$ in the row each connected to one side of the dual gate, actual programming stochastically occurs only in proportion to a duty ratio product of $X_i$ and $\delta_j$ signals in the total programming time, thus adjusting the weight. This may be less accurate than the method of calculating the exact partial differential value for each column or row and then directly applying a pulse. However, by adjusting all the weights of a layer at once, time and power consumption can be greatly saved. If the number of cycles used for programming is increased, stochastically programmed weights converge on a mathematically calculated update requirement. At this time, the dual gate structure of the present disclosure is used to set the threshold voltage so that the write TR is turned on only when on-voltage is applied to both the top gate and the bottom gate, thus enabling stochastic programming according to the duty ratio of the signals applied to the two gates, and thereby allowing the stochastic parallel update method to be applied.

Figures 1, 9A:
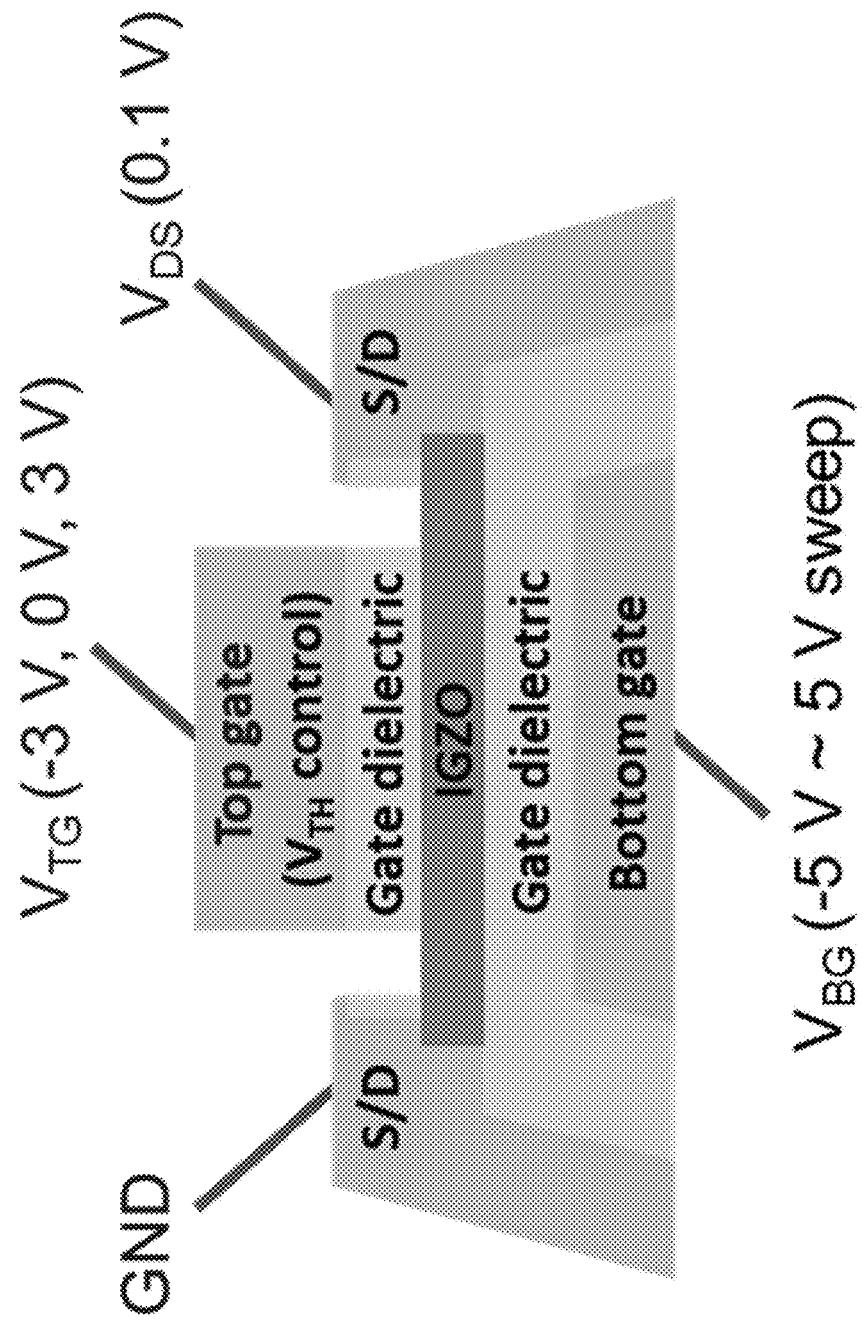
Figures 3, 9A:
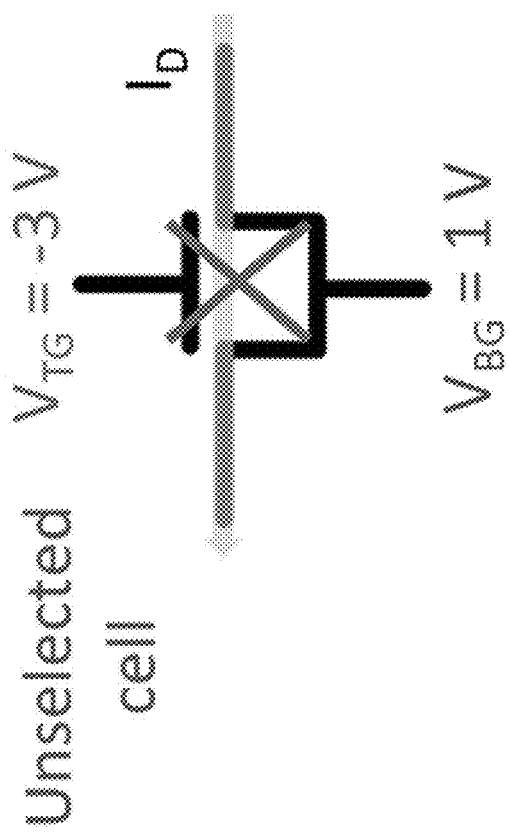
Figures 2, 9A:
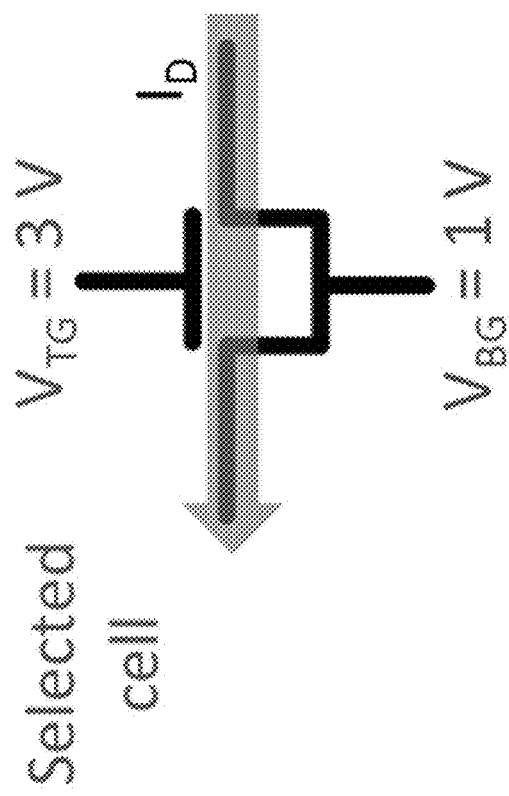

FIG. 9A-1 is a schematic diagram illustrating an oxide semiconductor transistor according to an embodiment of the present disclosure. FIGS. 9A-2, 9A-3 and 9B are diagrams illustrating a threshold voltage control process of the synapse device according to the present disclosure.

Referring to FIG. 9A-1, the synapse device according to the present disclosure may be composed of the oxide semiconductor transistor, and the oxide semiconductor transistor may be classified into the write transistor and the read transistor. Particularly, the write transistor of the synapse device may be composed of the dual gate structure with the gates formed at the bottom and top of the oxide semiconductor channel region.

In FIG. 9A-1, a control signal ($V_{TH}$ control) for controlling the threshold voltage VTH may be applied to the top gate formed at the top of the thin oxide semiconductor layer in the dual gate of the write transistor, and a voltage pulse for activating the write transistor may be applied to the bottom gate formed at the bottom of the thin oxide semiconductor layer.

For example, in FIG. 9A-2, in a state where voltage $V_{TG}$=3V is applied to the top gate, voltage $V_{BG}$=1V is applied to the bottom gate, so a corresponding cell may be selected to be activated. On the other hand, in FIG. 9A-3, in a state where voltage $V_{TG}$=−3V is applied to the top gate, voltage $V_{BG}$=1V is applied to the bottom gate, so a corresponding cell may be deactivated.

Figure 9B:
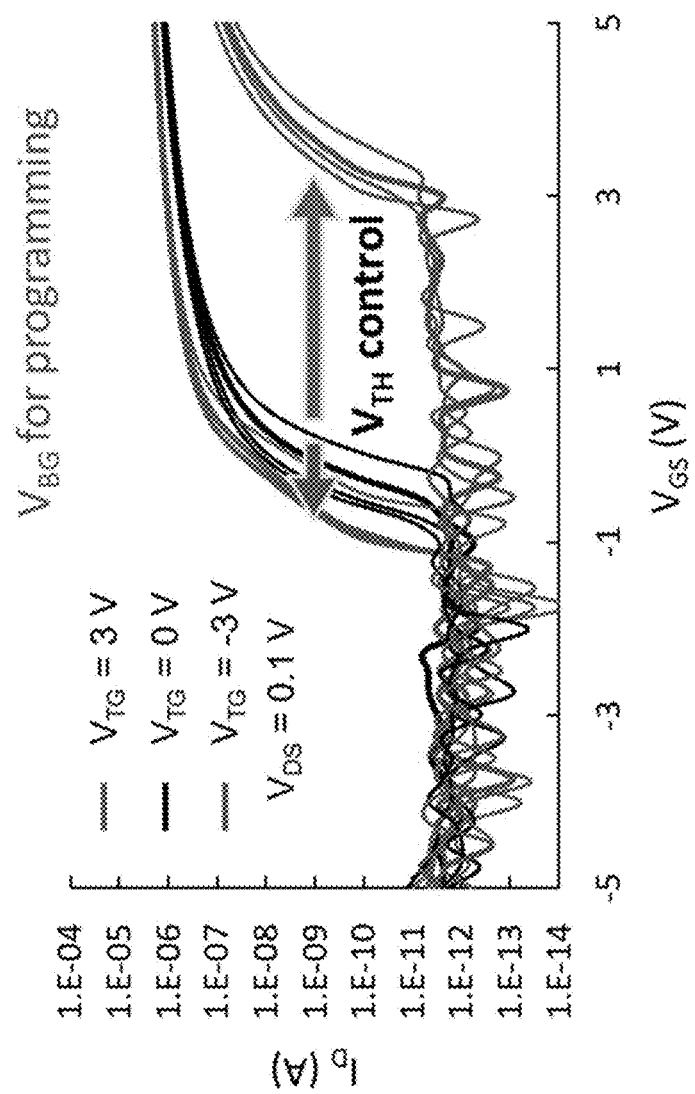

Referring to FIG. 9B, when voltages of $V_{TG}$=−3V and +3V are applied to the top gate of the write transistor with the dual gate structure, VTH shift may occur. Therefore, selective weight update is possible by adjusting $V_{TH}$ of 4V or more for the write transistor with the dual gate structure.

Figure 10:
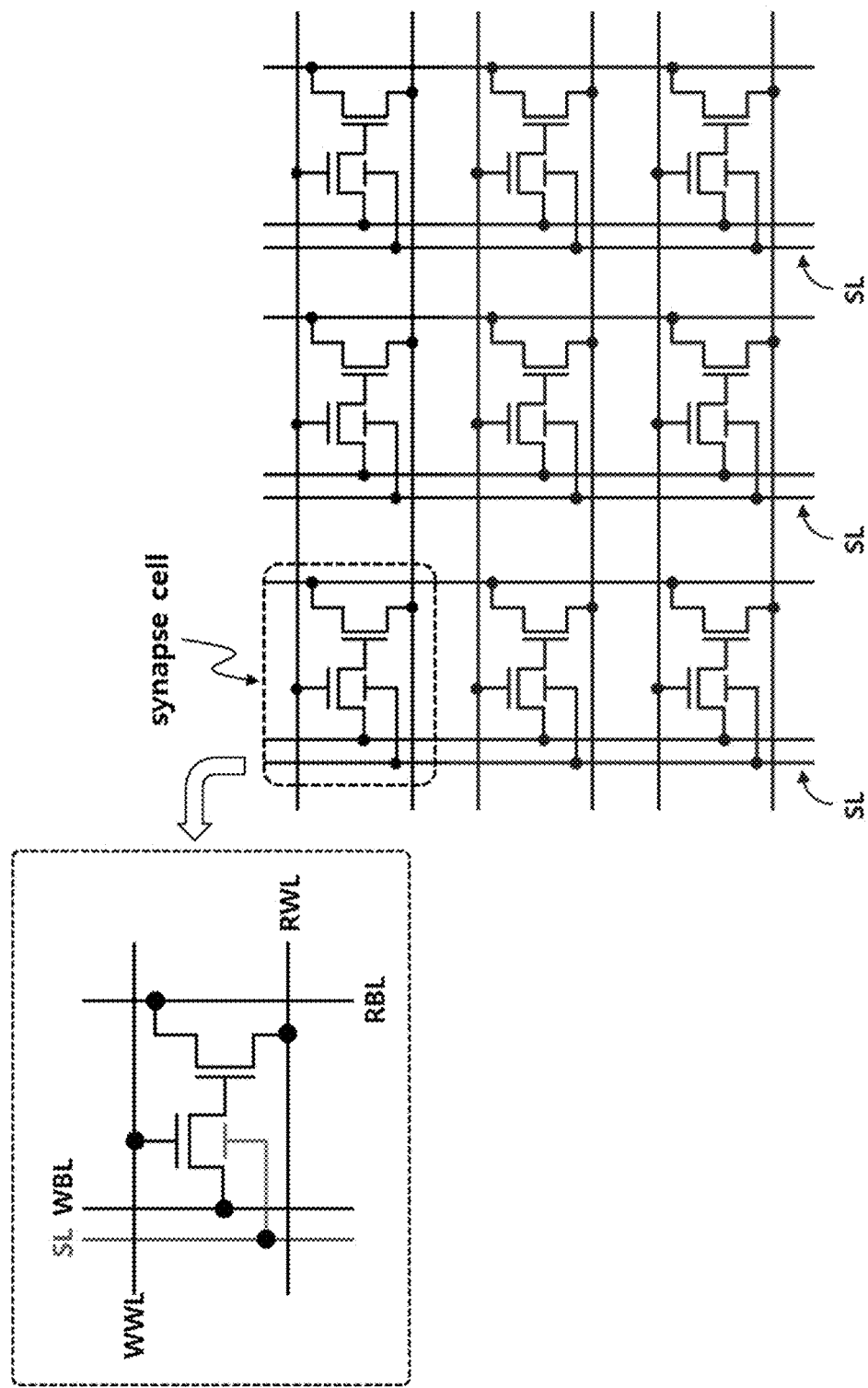
FIG. 10 is a diagram illustrating the synapse array according to the present disclosure.

FIG. 10 is a diagram illustrating an embodiment of the synapse array according to the present disclosure.

Referring to FIG. 10, the synapse array may be composed of a plurality of synapse devices to which the oxide semiconductor transistor with the dual gate structure is applied. For example, FIG. 10 may correspond to the synapse array arranged in a 3×3 structure. A synapse device (2T synapse) composed of the write transistor and the read transistor may be disposed in each synapse cell of the synapse array.

Particularly, each synapse device may be connected to a select line SL to control the threshold voltage of the write transistor. That is, the select line may be connected to the gate electrode of the write transistor. Therefore, the synapse array may include synapse devices arranged in each column and a plurality of select lines connected on the basis of the column.

Figure 11:
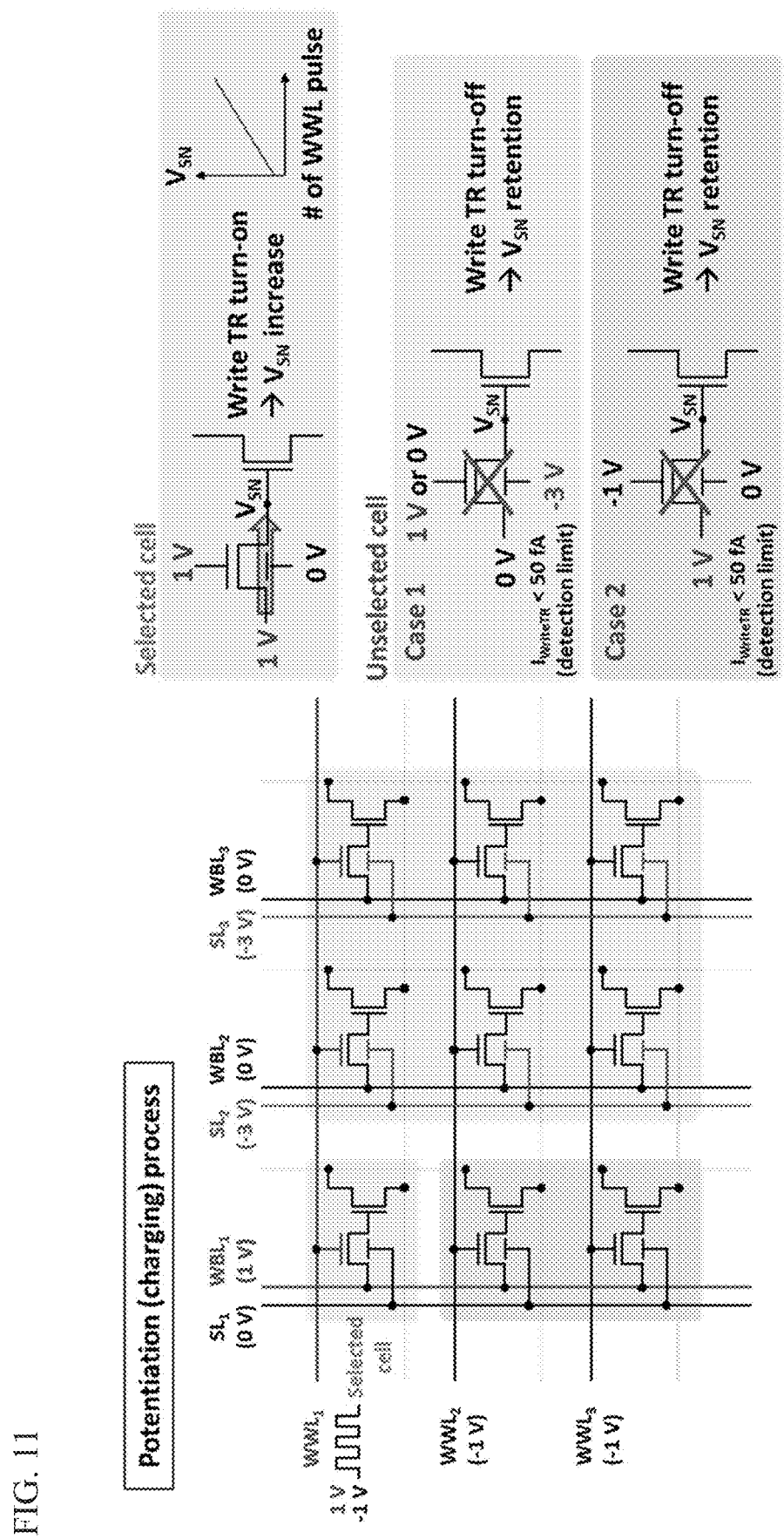
FIG. 11 is a diagram illustrating a charging process of the synapse array according to the present disclosure.
Figure 12:
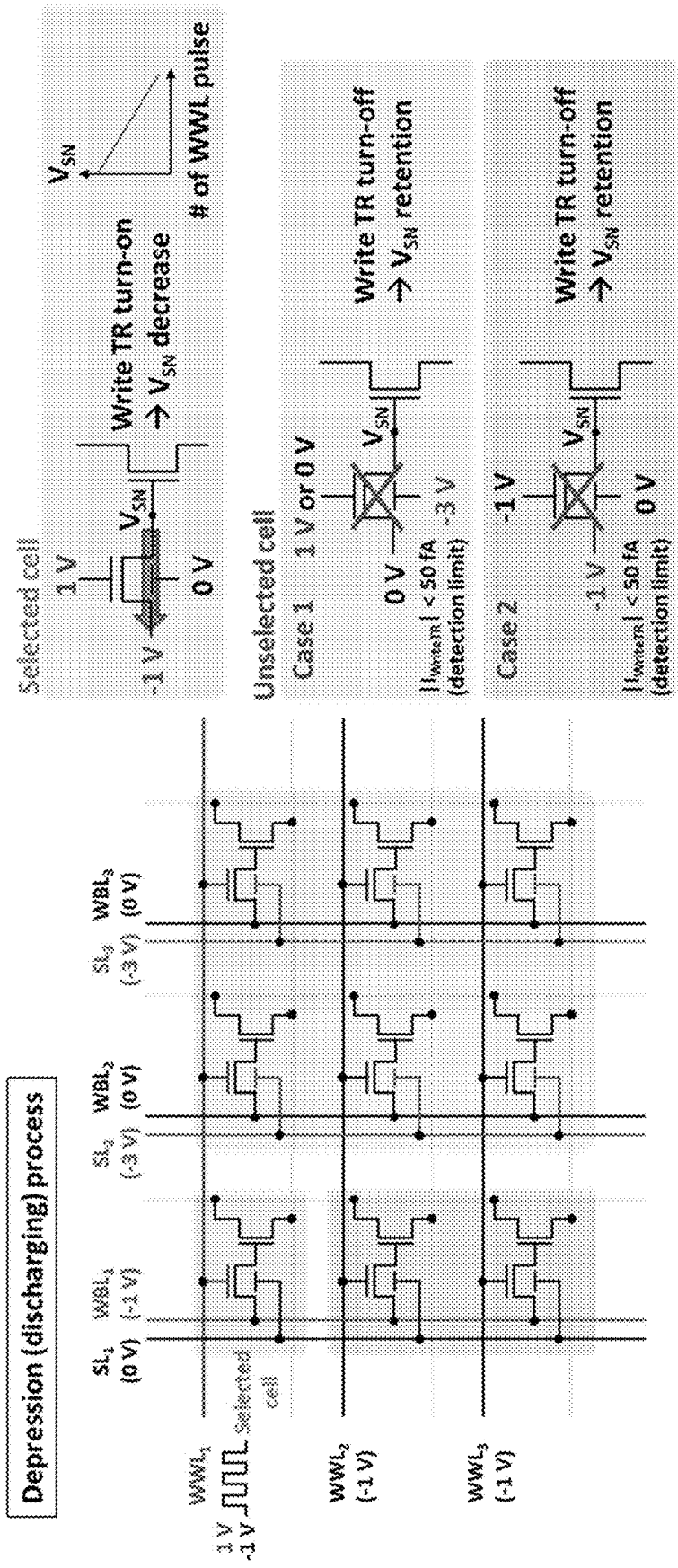
FIG. 12 is a diagram illustrating a discharging process of the synapse array according to the present disclosure.

FIG. 11 is a diagram illustrating a charging process of the synapse array according to the present disclosure, and FIG. 12 is a diagram illustrating a discharging process of the synapse array according to the present disclosure.

Referring to FIG. 11, the synapse array may be connected, on the basis of the column, to the synapse devices arranged in each cell through select lines $SL_1$, $SL_2$, $SL_3$, . . . . That is, the synapse array may apply a signal through the select line so as to selectively perform charging for the selected cell.

To be more specific, the threshold voltage may be controlled through the select line connected to the selected cell on the synapse array. When the gate line connected to the selected cell is activated, only the write transistor of the selected cell is activated, thus enabling selective programming. At this time, the process of controlling the threshold voltage may be performed by applying a specific voltage to the top gate of the write transistor through the select line. Particularly, voltage greater than the voltage applied to the bottom gate of the write transistor may be applied to the top gate.

In FIG. 11, 0V may be applied to the first select line $SL_1$ and −3V may be applied to the remaining select lines $SL_2$ and $SL_3$. Thus, when the programming pulse is applied through a first gate line $WWL_1$, the write transistor of the selected cell may be activated (Write TR turn-on). As the charging process proceeds according to the programming pulse, the voltage $V_{SN}$ applied to the gate electrode of the read transistor may progressively increase. In contrast, the cells of other select lines to which −3V is applied may deactivate the write transistor, and the voltage $V_{SN}$ applied to the gate electrode of the read transistor may be maintained as is.

Referring to FIG. 12, the synapse array may apply a signal through the select line to selectively discharge a selected cell. That is, 0V may be applied to the first select line $SL_1$ and −3V may be applied to the remaining select lines $SL_2$ and $SL_3$. Further, −1V may be applied as the discharge voltage to the selected cell. When the voltage pulse is applied through the first gate line $WWL_1$, the write transistor of the selected cell may be activated (Write TR turn-on). As the discharging process proceeds according to the voltage pulse, the voltage $V_{SN}$ applied to the gate electrode of the read transistor may progressively increase.

As described above, the present disclosure is advantageous in that a weight value of a synapse device can be progressively learned through pulse input, and power efficiency can be increased and expansion into a large array is enabled by proposing a high output current of an oxide semiconductor transistor. Further, the present disclosure is advantageous in that a weight value of a synapse device using an oxide semiconductor transistor is progressively learned through pulse input, and the synapse device using the oxide semiconductor transistor composed of a dual gate electrode is utilized, thus allowing only a weight of a desired cell to be selectively adjusted even when synapse devices are arrayed.

[Brief Description of Reference Numerals]

| | |
|---|---|
| 400: semiconductor substrate | 410: bottom gate |
| 420: bottom gate insulator | 430: thin oxide semiconductor layer |
| 440: source electrode | 450: drain electrode |
| 460: top gate insulator | 470: top gate |

[National Research and Development Project Supporting the Present Invention]

[Project Serial No] 1711166474

[Tax Project No] 2022M3F3 A2A03016763

[Name of department] Ministry of Science and ICT

[Task management (professional) institution name] National Research Foundation of Korea

[Research project name] Development of Next-generation Intelligent Semiconductor Technology

[Research Task Name] Research on High-linearity, High-durability, Multi-level Dynamic Synapse Unit Cell and Array in Oxide Semiconductor 2T Structure with Very Low Leakage Current (<1 fA) Characteristics

[Contribution rate] 100%

[Name of task performing organization] Pohang University of Science and Technology

[Research Period] 2022 Jan. 2~2022 Dec. 31

What is claimed is:

1. A synapse device, comprising:
an oxide semiconductor transistor divided into a write transistor and a read transistor,
wherein the write transistor is an oxide semiconductor transistor including a dual gate comprising:
a bottom gate located below a thin oxide semiconductor layer; and
a top gate located above the thin oxide semiconductor layer.

2. The synapse device of claim 1, wherein each of the top gate and the bottom gate of the oxide semiconductor transistor is adjustable in threshold voltage.

3. The synapse device of claim 1, wherein the oxide semiconductor transistor comprises:
a semiconductor substrate;
a bottom gate formed over the semiconductor substrate;
a bottom gate insulator formed over the bottom gate;
a thin oxide semiconductor layer formed over the bottom gate insulator;
source and drain electrodes formed on both ends of the thin oxide semiconductor layer;
a top gate insulator formed over the thin oxide semiconductor layer; and
a top gate formed over the top gate insulator.

4. The synapse device of claim 1, further comprising:
an ultra-thin insulator layer provided over the thin oxide semiconductor layer, wherein the ultra-thin insulator layer is formed of any one selected from SiO2, Al2O3, HfO2, a self-assembled monomolecular layer, and a combination thereof.

5. The synapse device of claim 1, wherein programming is for being performed only when the top gate and the bottom gate of the write transistor are simultaneously activated.

6. A method of operating a synapse array using a synapse device comprising an oxide semiconductor transistor divided into a write transistor and a read transistor, wherein the write transistor is formed in a dual gate structure comprising: a bottom gate located below a thin oxide semiconductor layer; and a top gate located above the thin oxide semiconductor layer, and wherein the method comprises:
programming a selected cell by individually adjusting a threshold voltage of each of the bottom gate and the top gate.

7. The method of claim 6, wherein a programming pulse is applied to the top gate, and a DC signal for selecting whether or not to program is applied to the bottom gate.

8. The method of claim 6, wherein programming is possible only when the top gate and the bottom gate of the write transistor are simultaneously activated.

9. The method of claim 6, wherein a write transistor of a corresponding cell is deactivated by increasing the threshold voltage of the write transistor of a cell different from the selected cell.

10. The method of claim 6, wherein programming is performed only when an ON voltage is applied to the top gate and the bottom gate, so update time in total time is determined by a product of a duty ratio of a row and a column.

11. A method of operating a synapse array using a synapse device comprising an oxide semiconductor transistor divided into a write transistor and a read transistor, the method comprising:
controlling a threshold voltage through a select line connected to a selected cell;
activating a gate line connected to the selected cell; and
activating only the write transistor of the selected cell among cells connected to the gate line according to a control result of the threshold voltage, thus programming the selected cell.

12. The method of claim 11, wherein the controlling the threshold voltage comprises controlling the threshold voltage by applying a specific voltage to a top gate of the write transistor through the select line.

13. The method of claim 12, wherein the controlling the threshold voltage comprises causing a voltage greater than a voltage applied to the bottom gate of the write transistor to be applied to the top gate.

* * * * *